(12) United States Patent
Song

(10) Patent No.: US 10,196,070 B2
(45) Date of Patent: Feb. 5, 2019

(54) SAFETY AND CLEAN VEHICLE MONITORING SYSTEM

(71) Applicant: Faraday & Future Inc., Gardena, CA (US)

(72) Inventor: Xiufeng Song, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/659,961

(22) Filed: Jul. 26, 2017

(65) Prior Publication Data

US 2018/0162415 A1 Jun. 14, 2018

Related U.S. Application Data

(60) Provisional application No. 62/366,823, filed on Jul. 26, 2016.

(51) Int. Cl.
*B60W 50/14* (2012.01)
*G06K 9/00* (2006.01)

(52) U.S. Cl.
CPC ............... *B60W 50/14* (2013.01); *G06K 9/00* (2013.01); *G06K 9/00832* (2013.01); *B60R 2300/301* (2013.01); *B60R 2300/8006* (2013.01)

(58) Field of Classification Search
CPC ........ B60R 21/01516; B60R 21/01532; G01G 17/06; G01G 19/4142; G08G 1/161

USPC .................................................. 340/461, 438
See application file for complete search history.

(56) References Cited

U.S. PATENT DOCUMENTS

| | | | |
|---|---|---|---|
| 2003/0007072 A1* | 1/2003 | Mattes | G06K 9/00362 348/77 |
| 2008/0174451 A1* | 7/2008 | Harrington | G08B 21/06 340/905 |
| 2013/0218404 A1* | 8/2013 | Abousleiman | G01L 5/225 701/34.4 |
| 2016/0275795 A1* | 9/2016 | Lippman | G08G 1/161 |

* cited by examiner

*Primary Examiner* — Emily C Terrell
(74) *Attorney, Agent, or Firm* — Veros Legal Solutions, LLP

(57) ABSTRACT

Certain embodiments use image-based technologies (e.g., digital cameras, light detection and ranging (LIDAR) systems, etc.) to monitor a driver-side floor space in a vehicle cabin and warn the driver when a foreign object is blocking or may potentially block a vehicle control (e.g., brake pedal). A foreign object can include a bottle, can, electronic device, keys, books, or the like. In some cases, foreign objects are detected by comparing a current image of the driver-side floor space with a reference image that is known to be free of foreign objects. The difference image can be used to identify any foreign objects in the driver-side floor space, and a corrective action can be taken to address the potential danger. Some corrective actions may include an audio and/or video alert to the driver, or in some cases, the vehicle may autonomously guide the vehicle to a safe location and stop.

18 Claims, 9 Drawing Sheets

SAFETY AND CLEAN VEHICLE MONITORING SYSTEM

CROSS-REFERENCE TO RELATED APPLICATIONS

This application claims the benefit of U.S. Provisional Application No. 62/366,823, filed Jul. 26, 2016, the entirety of which is hereby incorporated by reference.

BACKGROUND

Automotive vehicles have undergone significant safety improvements over the last few decades and new innovations are continually introduced into the market. Some notable improvements include blind spot monitoring and warning systems, lane tracking, collision avoidance systems, and night vision capabilities.

Much innovation in safety is focused on responding to or managing external conditions and/or third parties, but certain emerging technologies are beginning to address safety concerns that are more driver-centric. For instance, some systems do not allow a driver to set GPS navigation parameters while driving. Some systems track driver fatigue by detecting steering irregularities and/or evaluating the alertness of the driver. While these developments continue to enhance public safety and improve the driving experience, more innovation in driver safety is needed.

SUMMARY

In certain embodiments, a computer-implemented method of monitoring a cabin in a vehicle includes accessing image data corresponding to a driver-side floor space in the cabin, accessing reference image data corresponding to the driver-side floor space in the cabin, comparing the image data with the reference image data, determining that a foreign object is in the driver-side floor space based on a difference between the image data and reference image data, and performing a corrective action in response to determining that the foreign object is in the driver-side floor space. The method can be performed by one or more processors. In some cases, the reference image data does not include any foreign object.

In some embodiments, the image data can be received from one of a digital camera or a light detection and ranging (LIDAR) system. The foreign object may not be fixed to the vehicle cabin and may freely move around the driver-side floor space. In some implementations, the method further includes identifying a set of features in the received image data and the reference image data, where the set of features includes a driver control in the driver-side floor space, and determining a location of the foreign object in the driver-side floor space, where the corrective action is based on the location of the foreign object with respect to a location of the driver control. The corrective action can include an audio or video-based alert when the foreign object is located beyond a threshold distance from the location of the driver control, and the corrective action may include taking autonomous control of the vehicle when the foreign object is within a threshold distance from the location of the driver control. In further embodiments, the set of features can further include a driver's footwear located in the driver-side floor space, and the method can further include determining that the driver's footwear is an inappropriate type of footwear based on characteristics of the footwear including physical dimensions, an amount of contact between a bottom surface of the footwear and the driver control, or an amount of contact between a bottom surface of the driver's foot and the driver's footwear, and generating an alert when the driver's footwear is of the first type or the second type of footwear.

In some embodiments, a system includes one or more processors and one or more non-transitory computer-readable storage mediums containing instructions configured to cause the one or more processors to perform operations including accessing image data corresponding to a driver-side floor space in the cabin, accessing reference image data corresponding to the driver-side floor space in the cabin, comparing the image data with the reference image data, determining that a foreign object is in the driver-side floor space based on a difference between the image data and reference image data, and performing a corrective action in response to determining that the foreign object is in the driver-side floor space. In some instances, reference image data may not include any foreign objects.

In further embodiments, the image data can be received from one of a digital camera or a light detection and ranging (LIDAR) system. The foreign object may not be fixed to the vehicle cabin and may freely move around the driver-side floor space. The system can further include instructions configured to cause the one or more processors to perform operations including identifying a set of features in the received image data and the reference image data, where the set of features includes a driver control in the driver-side floor space. The system may further include instructions configured to cause the one or more processors to perform operations including determining a location of the foreign object in the driver-side floor space, where the corrective action is based on the location of the foreign object with respect to a location of the driver control. In some cases, the corrective action can include an audio or video-based alert when the foreign object is located beyond a threshold distance from the location of the driver control, and the corrective action can include taking autonomous control of the vehicle when the foreign object is within a threshold distance from the location of the driver control. The set of features can further include a driver's footwear located in the driver-side floor space, and the system can further including instructions configured to cause the one or more processors to perform operations including determining that the driver's footwear is an inappropriate type of footwear based on characteristics of the footwear including physical dimensions, an amount of contact between a bottom surface of the footwear and the driver control, or an amount of contact between a bottom surface of the driver's foot and the driver's footwear, and generating an alert when the driver's footwear is of the first type or the second type of footwear.

In certain embodiments, a computer-implemented method of monitoring a cabin in a vehicle includes accessing image data corresponding to a driver-side floor space in the cabin, analyzing the image data, identifying, in the image data, a driver's footwear in the driver-side floor space, determining physical characteristics of the driver's footwear, determining that the driver's footwear is inappropriate footwear for driving based on the determined physical characteristics of the driver's footwear, and performing a corrective action in response to determining that driver's footwear is inappropriate footwear for driving. The method can be performed by one or more processors. In some cases, the image data may be received from one of a digital camera or a light detection and ranging (LIDAR) system. The determined physical characteristics may include at least one of the driver's footwear physical dimensions. The corrective action can include an audio or video-based alert, and/or taking autonomous control of the vehicle.

In some embodiments, a computer-implemented method of monitoring a cabin in a vehicle includes means for accessing image data corresponding to a driver-side floor space in the cabin, means for accessing reference image data corresponding to the driver-side floor space in the cabin, means for comparing the image data with the reference image data, means for determining that a foreign object is in the driver-side floor space based on a difference between the image data and reference image data, where the reference image data does not include any foreign objects, and means for performing a corrective action in response to determining that the foreign object is in the driver-side floor space.

BRIEF DESCRIPTION OF THE DRAWINGS

The detailed description is set forth with reference to the accompanying figures.

DETAILED DESCRIPTION

Figure 1:
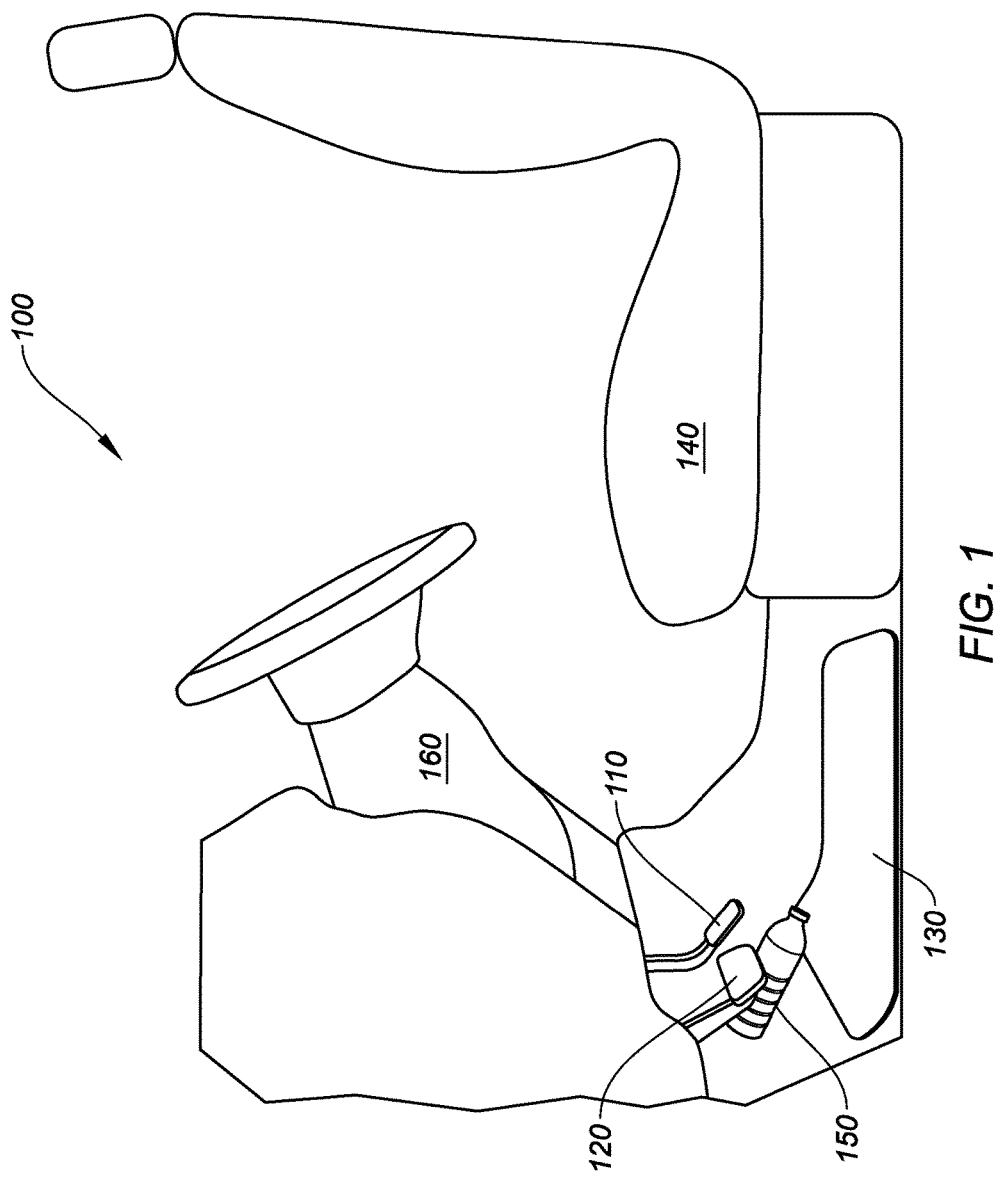
FIG. 1 shows a simplified diagram of a driver-side floor space in a cabin of a vehicle.

Aspects of the present disclosure relate generally to vehicular systems, and in particular to systems and methods for monitoring a vehicle cabin, according to certain embodiments.

In the following description, various embodiments of vehicular systems will be described. For purposes of explanation, specific configurations and details are set forth in order to provide a thorough understanding of the embodiments. However, it will be apparent to one skilled in the art that certain embodiments may be practiced without every disclosed detail. Furthermore, well-known features may be omitted or simplified in order not to obscure the embodiments described herein.

Certain embodiments of the invention are directed to methods and systems for monitoring a driver-side floor space in a vehicle cabin to help ensure the safety of the occupants. For example, foreign objects such as bottles, cans, children's toys, electronic devices, or other items may roll or slide under a vehicle control (e.g., gas or brake pedal) and prevent a driver from activating it. In a situation that requires quick braking, for instance, a blocked brake pedal could lead to an otherwise avoidable accident with potentially devastating consequences.

Certain embodiments can use image-based technologies (e.g., digital cameras, light detection and ranging (LIDAR) systems, etc.) to monitor a driver-side floor space in a vehicle cabin and warn the driver when a foreign object is blocking or may potentially block a vehicle control. In some cases, foreign objects are detected by comparing a current image of the driver-side floor space with a reference image that is known to be free of foreign objects. The difference image can be used to identify any foreign objects in the driver-side floor space, and a corrective action can be taken to address the potential danger (e.g., audio and/or video messaging).

Some implementations can include identifying a set of features in the image including driver controls and determining a location of the identified foreign object with respect to the location of the driver controls. Thus, an appropriate corrective action can be taken based on a determined risk associated with the respective locations of the foreign object and vehicle controls. For instance, when a foreign object is found to be near the seat (i.e., relatively far away from the vehicle controls) with little to no mobility (based on its historical movement), a video and/or audio alert can alert the driver to the presence and location of the foreign object so that the driver can respond accordingly. In contrast, when a foreign object is found to be close to the vehicle controls and/or has a high mobility (e.g., can easily move about the driver-side floor space), a more pronounced alert can be issued (e.g., require driver feedback or confirmation that the object has been removed). In situations where a foreign object is determined to be actually lodged under a vehicle control, even more pronounced corrective actions may be taken, such as switching the vehicle to autonomous control and causing the vehicle to automatically and safely pull to the side of the road to allow the driver to remove the foreign object. In certain embodiments, a driver's footwear can be identified and analyzed to alert the driver when an unsafe article of footwear (e.g., high heels, loose flip flops, etc.) is detected while driving. One of ordinary skill in the art would understand the many variations, modifications, and alternative embodiments thereof.

FIG. 1 shows a simplified diagram of a driver-side floor space in a cabin 100 of a vehicle, according to certain embodiments. Cabin 100 includes first driver control 110, second driver control 120, floor mat 130, driver's seat 140, and steering column 160. First driver control 110 and/or second driver control 120 can be a pedal, lever, or any suitable control that may perform any suitable function (e.g., acceleration, braking, parking brake, etc.). In FIG. 1, first driver control 110 is an accelerator pedal and second driver control 110 is a brake pedal. Additional driver controls can be included (e.g., emergency brake, hood release, fuel door release, etc.). Floor mat 130 can be fixed to the floor by any suitable means including pins, Velcro, adhesive, fastening hardware, or the like, and may be any suitable size or dimension. Some embodiments may not include a floor mat. Driver's seat 140 can by any type of seat (e.g., bucket seat, bench seat, folding seat, etc.) and may be fixed or adjustable in any number of axes. Steering column 160 supports a steering wheel and may be configured in any suitable arrangement. That is, older vehicles may include conventional steering columns with few adjustment settings, while contemporary or future models may have a vast assortment of adjustment settings, including steering column retraction (e.g., steering wheel and column folds up or retracts into dash board during an autonomous driving mode). One of ordinary skill in the art would understand the many variations, modifications, combinations, and alternative embodiments thereof.

Cabin 100 further includes foreign object 150. In some cases, foreign object 150 can be any object that is not normally part of the driver-side floor space. Foreign object 150 may not be fixed to any portion of the vehicle cabin (e.g., floor, door panel, etc.). It may also be possible that foreign object 150 can freely move around the driver-side floor space. Some non-limiting examples of a typical foreign object include bottles, cans, spherical objects, toys, electronic devices, keys, object that can roll, or any object that is not intended to be located in the driver-side floor space, as would be understood by one of ordinary skill in the art. Although cabin 100 depicts a typical arrangement of features in a conventional vehicle, any configuration of a cabin having any assortment of controls, accessories (e.g., floor mats, panels, foot rests, etc.), or the like, are contemplated. The foregoing embodiments and corresponding figures will refer to aspects of FIG. 1 for the sake of explanation, however one of ordinary skill in the art would understand and appreciate that the many novel concepts described herein are applicable to any suitable vehicle type and/or configuration.

Figure 2:
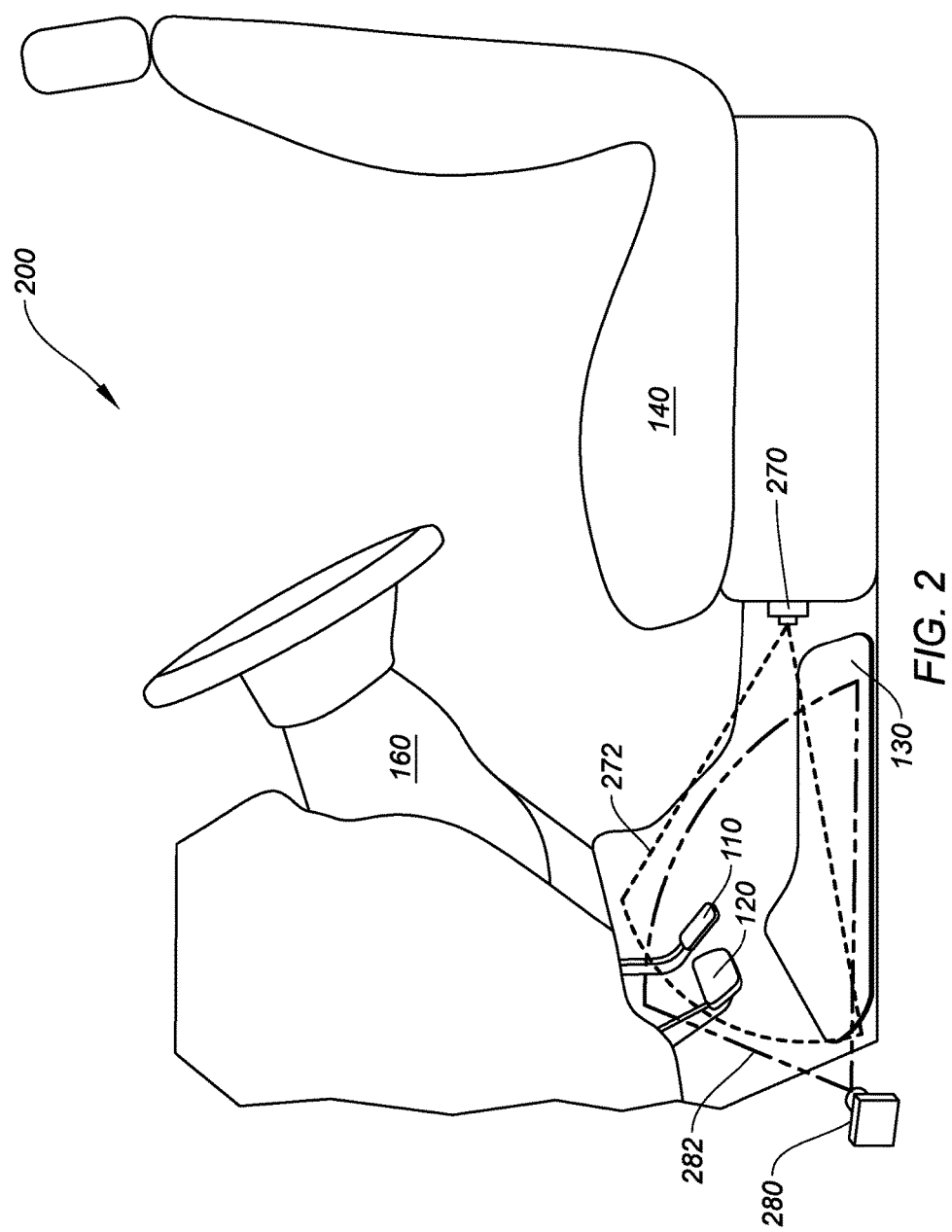
FIG. 2 shows a simplified diagram of a driver-side floor space in a cabin of a vehicle including a plurality of sensors, according to certain embodiments.

FIG. 2 shows a simplified diagram of a driver-side floor space in a cabin 200 of a vehicle including a plurality of sensors 270, 280, according to certain embodiments. One or more sensors can be used to generate images of the driver-side floor space, which can be compared to reference image(s) of the driver-side floor space to find differences that may include foreign objects, as discussed above. Cabin 200 can include first driver control 110, second driver control 120, floor mat 130, driver's seat 140, steering column 160, and sensors 270, 280.

In some embodiments, sensors 270, 280 can be any type of sensor capable of generating an image. For example, sensors 270, 280 can be instances or part of a digital camera system, LIDAR system, ultrasonic system, stereoscopic system, infra-red (IR) system, sonar-based system, or other systems that can be used to generate an image (e.g., video or audio image) for use in the manner described herein, or any combination thereof.

In certain embodiments, there can be any number of sensors. Although two sensors are shown in FIG. 2, one sensor or three or more sensors can be used. Sensors 270, 280 can be placed in any suitable location in cabin 200. In exemplary embodiments, some preferred sensor mounting locations include areas underneath the front end of seat 140 and on a side of cabin 200 near or on the driver-side door (not shown), as these locations can typically provide a wide viewing area of the driver-side floor space. For example, sensor 270 can generate an image of a front view of the driver-side floor space covering an area 272 that includes both driver controls 110, 120, some or all of floor mat 130, and peripheral areas, such that there are preferably no blind spots in the driver-side floor space. Similarly, sensor 280 can generate an image of a side view of the driver-side floor space covering an area 282 that includes both driver controls 110, 120, some or all of floor mat 130, and peripheral areas. Some sensors may have a wider viewing angle such that a single sensor may be sufficient to adequately monitor that area contained in the driver-side floor space. The images (e.g., image data) provided by sensors 270, 280 may be continuously or periodically (or aperiodically) generated and can be accessible by one or more processing devices (e.g., processor 904 of FIG. 9), as further discussed below.

In some instances, in embodiments where sensor(s) for capturing visible light are used, there may be insufficient lighting in the vehicle cabin to generate useful image data (e.g., for digital camera sensors) that can be analyzed and compared. Therefore, additional lighting can be added to adequately illuminate the driver-side floor space when images or reference images are generated.

Any suitable method of image processing can be used to analyze and compare images generated by sensors 270, 280. For example, an algorithm can include different image domain differentiation after proper image correction, light compensation, or geometric distortion correction. In some cases, the differentiation can be implemented in a transformed domain. Some examples can include the differentiation of subspace, the differentiation of image transformation in a different domain, or the like. One of ordinary skill in the art would understand the many variations, modifications, and alternative embodiments thereof.

Figure 3:
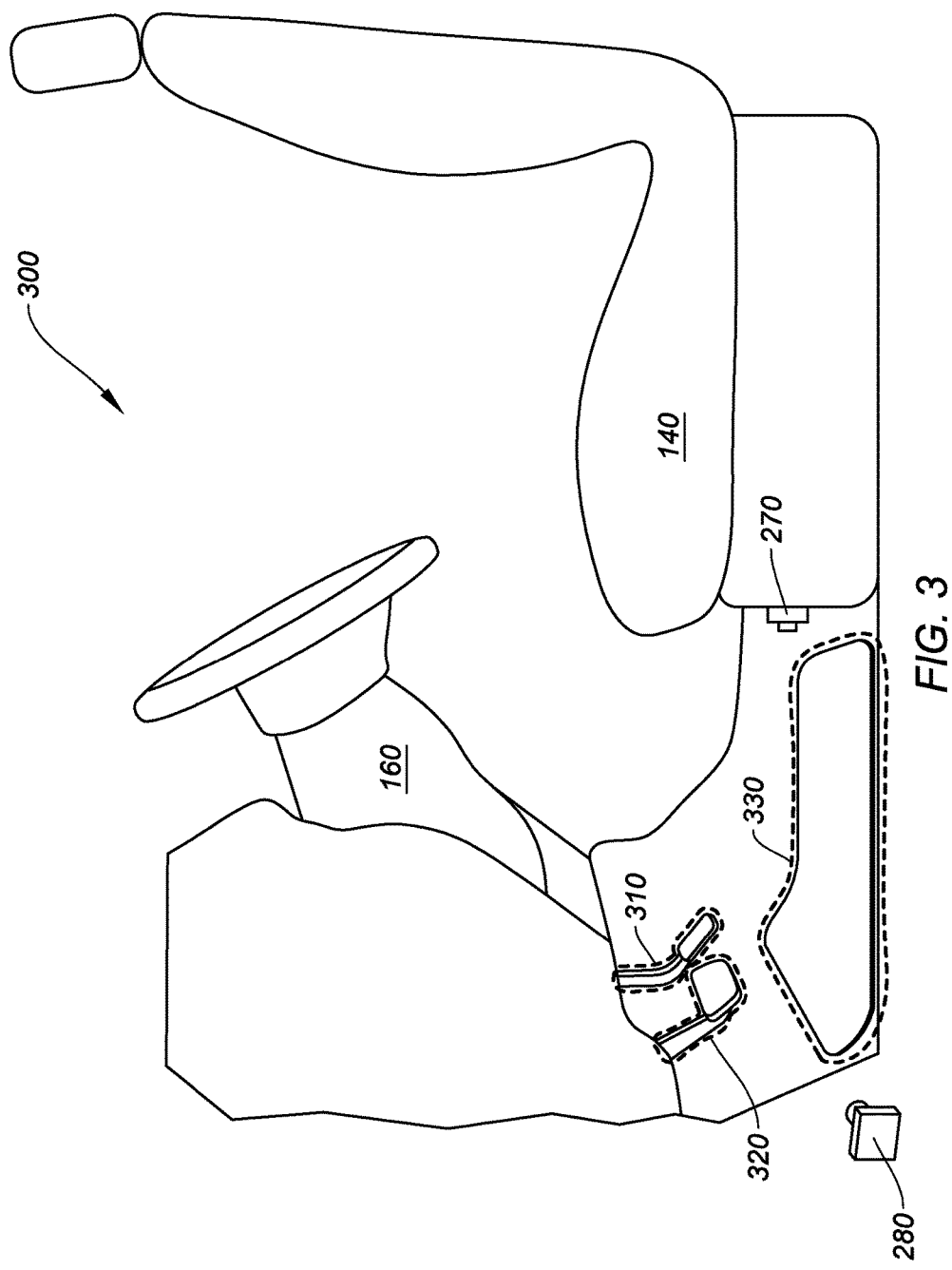
FIG. 3 shows a simplified diagram of a driver-side floor space in a cabin of a vehicle with a set of computer-identified features, according to certain embodiments.

Image processing can include analog and/or digital image analysis, image sharpening/smoothing algorithms for improving a quality or resolution, image segmentation can be for identifying certain features (e.g., driver controls 110, 120, floor mat 130, foreign object 150, or other vehicular features) and feature extraction, as would be understood by one of ordinary skill in the art. Feature extraction (e.g., see FIG. 3) from image data can be based on certain image and/or pixel properties including, but not limited to, color, intensity, texture, and the like FIG. 3 shows a simplified diagram of a driver-side floor space in a cabin 300 of a vehicle with a computer-identified set of features 310-330, according to certain embodiments. Cabin 300 can include first driver control 110, second driver control 120, floor mat 130, driver's seat 140, steering column 160, and sensors 270, 280. In some implementations, a set of features can be identified by a system (e.g., system 900 of FIG. 9) using any suitable image analysis techniques (e.g., image segmentation), as discussed above. The set of features can include first and second driver controls 110, 120, floor mat 130, or any other features in the driver-side floor space. Referring to FIG. 3, object 310 is a computer-identified object corresponding to first driver control 110, object 320 is a computer-identified object corresponding to second driver control 110, and object 330 is a computer-identified object corresponding to floor mat 130. Once features are identified, they can be used to provide more accurate foreign object detection and may be used to help determine a present risk based on a distance of a foreign object to certain driver controls, as further discussed below. In these embodiments, cabin features are individually identified in order to detect foreign objects in the driver-side floor space. In other embodiments, foreign objects are detected without individually identifying cabin features.

Figure 4:
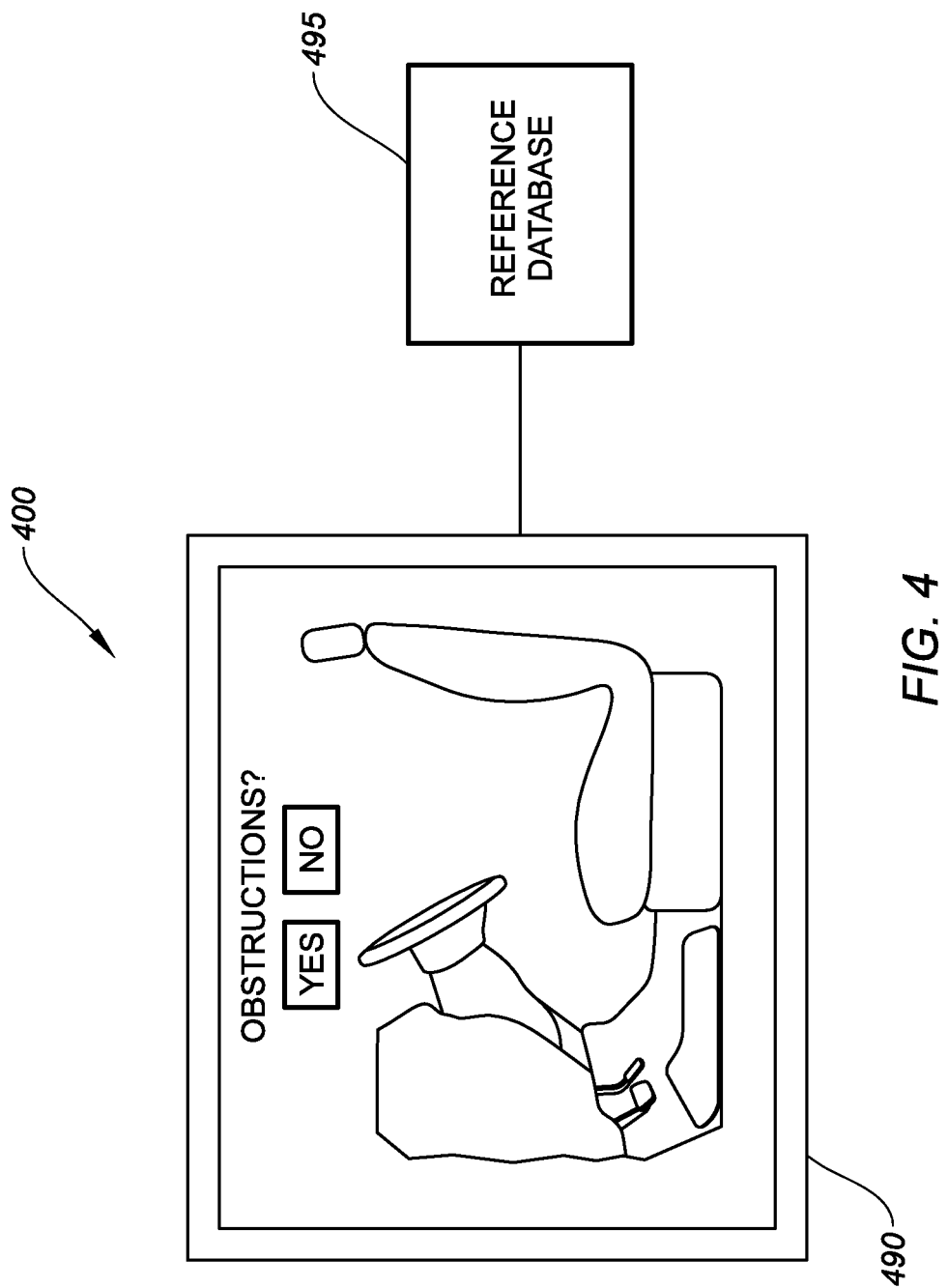
FIG. 4 shows a simplified diagram of a user-interface (UI) presenting a driver query, according to certain embodiments.

FIG. 4 shows a simplified diagram of a user-interface (UI) 400 presenting a driver query, according to certain embodiments. In some implementations, in order to detect whether a foreign object is located in the driver-side floor space of a vehicle cabin, a current image (e.g., image data) is compared to a "clean" reference image (e.g., reference image data) to search for differences, which may be indicative of a foreign object. The "clean" reference image should be devoid of any foreign objects or other features that are not intended to be part of the driver-side floor space.

Referring to FIG. 4, UI 400 includes a display 490 showing a current image of the driver-side floor space of a vehicle cabin and a query asking whether an obstruction (e.g., foreign object) is visible in the image. If an obstruction is not visible (e.g., driver selects "No"), then the image can be stored in reference database 495 as a reference image (i.e., reference image data). If there is a visible obstruction (e.g., driver selects "Yes"), then the image may not be stored as a reference image. This manual identification of a reference image can be referred to as a calibration step. In some embodiments, a reference image can be established by the manufacturer at the time of assembly. In some instances, the image quality of an established reference image (or present image) may be negatively affected by low lighting conditions. In such cases, multiple attempts can be made with or without additional lighting, the manual calibration step may be performed at a later time when lighting conditions are improved, multiple calibration requests may be generated to create an aggregate image, or any other method can be used to ensure adequate image quality for the reference image.

In certain embodiments, feature detection can be applied to a reference image (see, e.g., FIG. 3), which can be used improve the accuracy of image analysis. Feature detection can include identifying certain vehicle controls, accessories, etc., that are known to be allowable features in the driver-floor space of the vehicle cabin.

In some cases, feature detection may include an iterative learning process. For instance, a driver may change certain aspects of the driver-floor space, which may require a periodic refresh of the reference image data. As an example, a floor mat or vehicle control cover may be added or changed to enhance aesthetic characteristics of the vehicle. In such cases, the dimensions of these features may change, which may require subsequent calibrations to ensure that the reference figure accurately portrays the present configuration of the vehicle cabin with no foreign objects present. New calibration procedures can be established automatically (e.g., on a periodic basis) or manually, or a combination thereof, and saved in a corresponding database (e.g., reference database 495).

In some embodiments, reference images can be stored locally (within the corresponding vehicle), externally (e.g., in the cloud), or a combination thereof. In certain implementations, reference database 495 can be a part of or subsumed by storage device 906 of FIG. 9, as further discussed below. Similarly, display 490 and any other input/output means can be a part of system 900.

Figure 5:
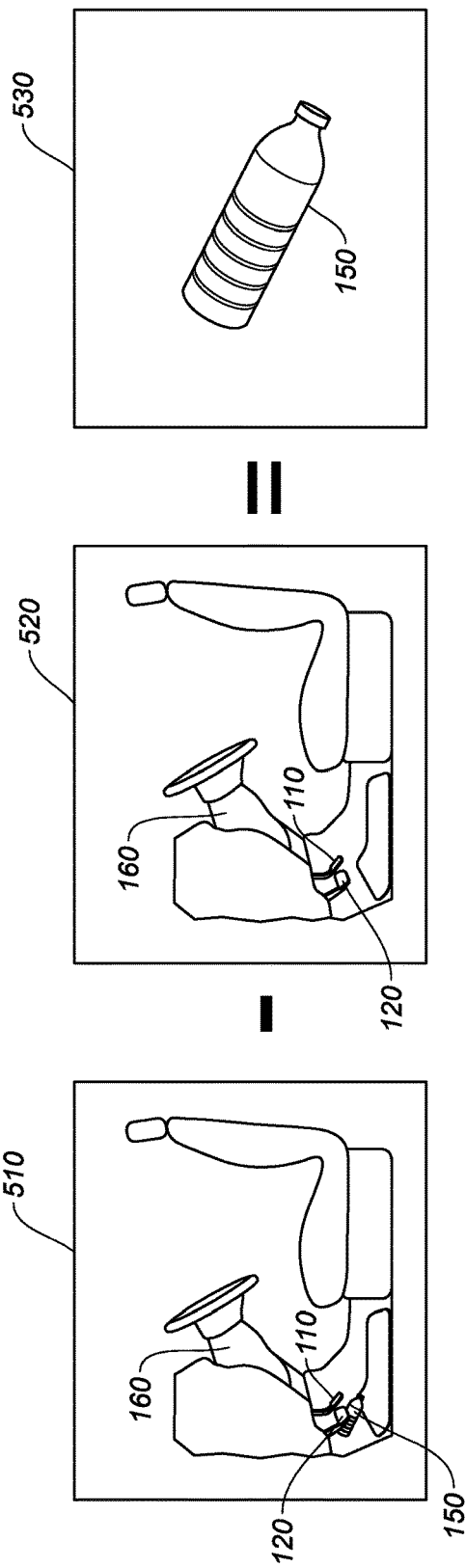
FIG. 5 shows a computer-implemented process of comparing received image data with reference image data and determining a presence of a foreign object based on a difference image, according to certain embodiments.

FIG. 5 shows a process of comparing received image data with reference image data and determining a presence of a foreign object based on a difference image, according to certain embodiments. Image 510 shows a present image of the driver-side floor space including first driver control 110, second driver control 120, floor mat 130, driver's seat 140, steering column 160, and foreign object 150. Image 520 shows a reference image of the driver-side floor space including first driver control 110, second driver control 120, floor mat 130, driver's seat 140, and steering column 160. Reference image 520 can be a calibration image, as discussed above with reference to FIG. 4. Reference image 520 can be subtracted from present image 510 to generate a difference image 530. Difference image 530 may exclude some or all common features (e.g., driver controls 110, 120; driver's seat 140, etc.), leaving foreign object 150. Once foreign object 150 is identified (e.g., via the difference algorithm described above), the driver can be alerted by any suitable means (e.g., video, audio, etc.).

In some embodiments, varying lighting conditions may cause present image 510 to differ considerably from reference image 520. In such cases, shadows or other light-based effects may affect the reliability of foreign object detection. Feature detection schemes may markedly improve the accuracy of foreign object detection. Knowing precisely where certain features are located (e.g., see FIG. 3) can mitigate or reduce false positive identifications of foreign objects due to light-based effects. For example, present image 510 may include poor lighting with moderate shadows, while reference image 520 may have excellent lighting with no shadows. A difference image may identify certain non-existent foreign objects based on differences in lighting between the two images. However, knowing where a driver control is located, for example, allows the image analysis algorithm(s) (e.g., performed by aspects of system 900) to proportionally weigh, disregard, or otherwise factor in lighting differences in images when determining a presence of foreign object, as would be understood by one of ordinary skill in the art.

Figure 6:
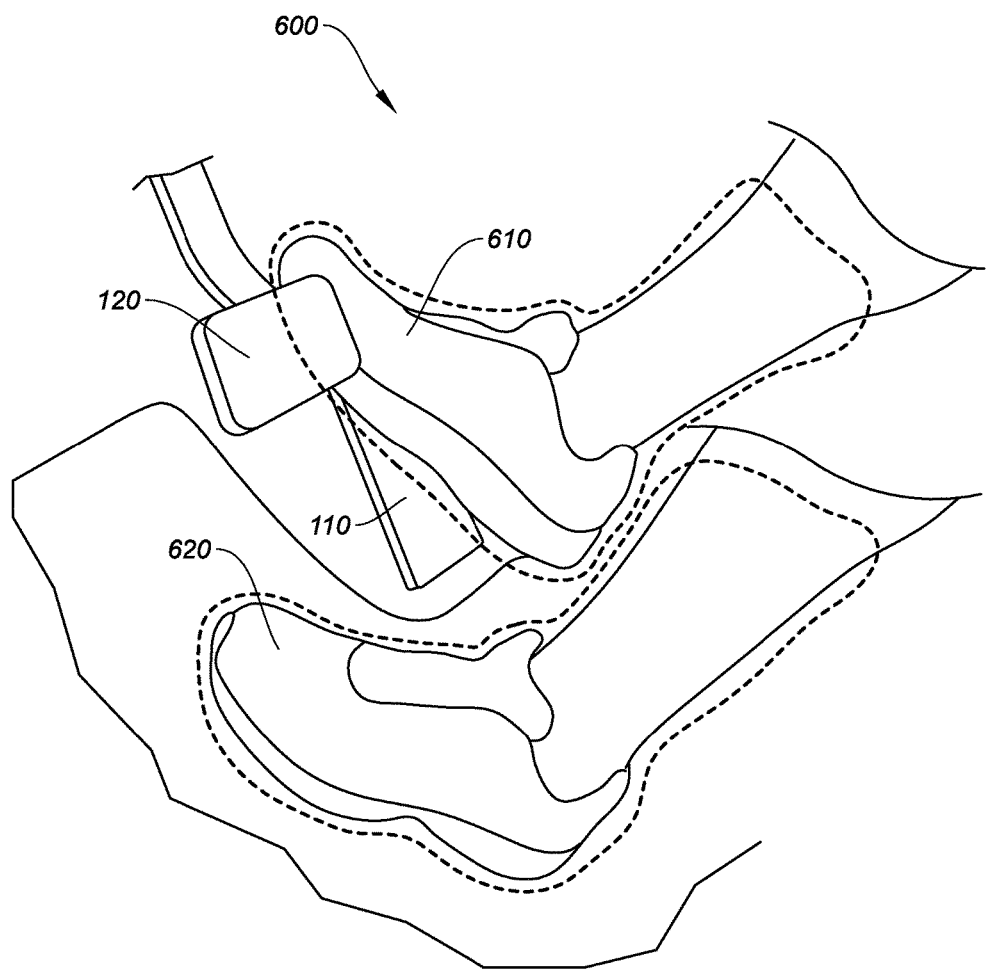
FIG. 6 is a simplified diagram showing the identification of a driver's feet in a driver-side floor space of a vehicle, according to certain embodiments.

FIG. 6 shows a simplified diagram illustrating the identification of a driver's feet 610, 620 in a driver-side floor space of a vehicle cabin, according to certain embodiments. As previously discussed, reference images may be generated prior to a driver getting into a vehicle. Vehicle features (e.g., driver control 110) tend to be fixed in place, such that foreign object detection procedures (e.g., comparing present image data with reference image data as shown in FIG. 5) are possible prior to a driver getting into the vehicle. This may help identify and locate any potentially dangerous foreign objects before a driver operates a vehicle. However, in some instances, a foreign object may fall into the driver-side floor space during the operation of the vehicle. The presence of a driver's legs and feet may complicate foreign object detection process because they can occupy a relatively large amount of space, they can block a legitimate foreign object from view for one or more sensors, and a driver may frequently shift the position of their feet, which can cause false positive foreign object detections. Some methods to address these are issues are addressed below.

Some embodiments may employ multiple sensors, as shown in FIG. 2. In multiple sensor configurations, areas that may be obscured from one sensor may be visible by another. Thus, combination or composite imaging schemes may improve the identification of legitimate foreign objects.

Certain embodiments may employ feature detection, as described above with respect to FIG. 3. Because a driver's feet typically shift positions during the normal course of driving, feature detection algorithm(s) may use aggregate images, weighted composite images based on foot position over time, segmentation algorithms, and/or any other method of improving the accuracy of identifying a driver's feet using feature detection. In some cases, machine learning can be used to learn, over time, the size of the driver's feet and/or locations where the driver typically positions their feet to help improve feature detection accuracy.

In some embodiments, certain size thresholds can be used to identify a foreign object. For instance, foreign objects may tend to be relatively small. In some cases, the size of a foreign object may be similar to a size of a foot or smaller, which may be big enough to prevent a brake pedal from depressing effectively, but small enough that a driver might not see it. In settings with poor lighting (e.g., night time, heavy cloud cover, etc.), even large objects may go unnoticed by the driver. Thus, a size threshold can be used to better identify and differentiate legitimate foreign objects from false positive identifications. The size threshold may be, e.g., the size of an average human foot such that false positive foreign object identifications caused by, e.g., different lighting conditions, can be filtered out in the foreign object identification process. The size threshold can be set to any suitable size, volume, shape, or other metric, as would be understood by one of ordinary skill in the art. Some or all aspects of FIG. 6 can be performed by system 900 of FIG. 9, as further discussed below.

Figure 7A:
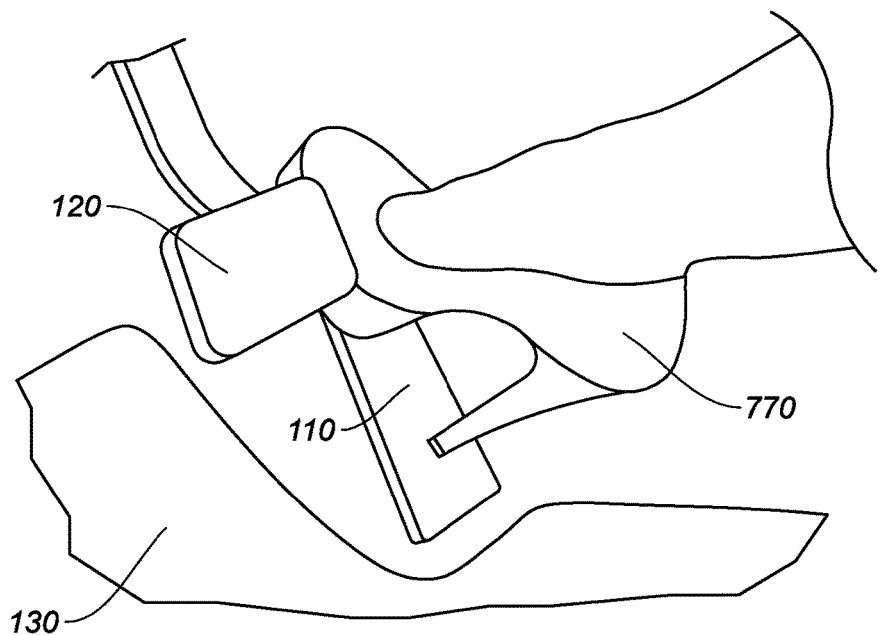
FIG. 7A shows a simplified diagram showing the identification of one example of a driver's inappropriate footwear in a driver-side floor space of a vehicle, according to certain embodiments.
Figure 7B:
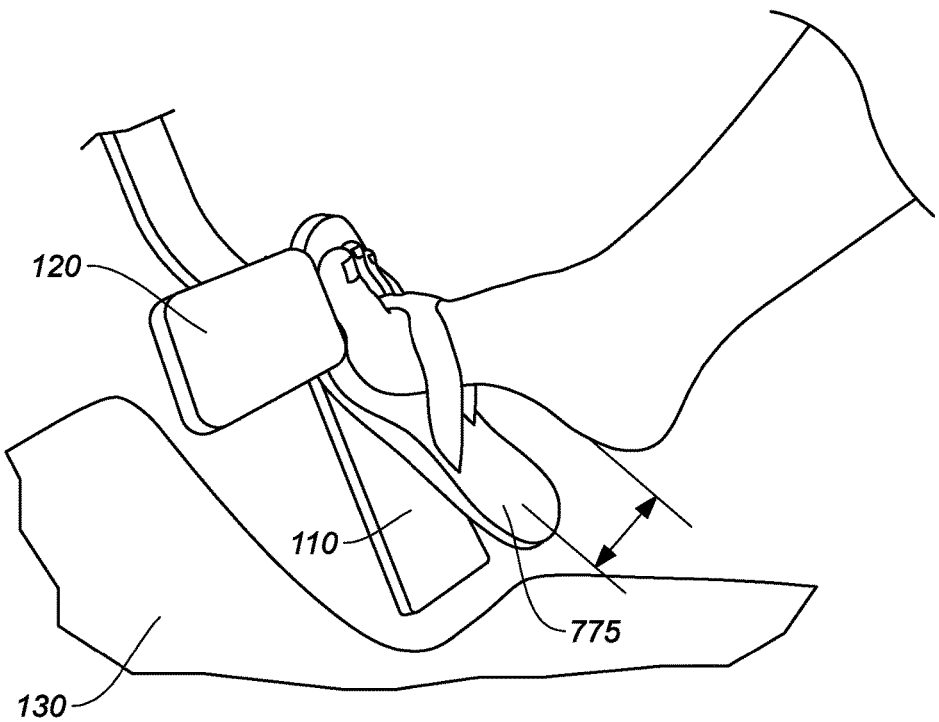
FIG. 7B shows a simplified diagram showing the identification of another example of a driver's inappropriate footwear in a driver-side floor space of a vehicle, according to certain embodiments.

FIGS. 7A and 7B are simplified diagrams showing the identification of a driver's footwear in a driver-side floor space of a cabin of a vehicle, according to certain embodiments. In addition to foreign objects, certain footwear may be dangerous to wear while driving because their shape, size, and/or fit can impair a driver's ability to engage certain vehicle controls (e.g., accelerator, brake, etc.). In FIG. 7A, a high heel shoe 770 (e.g., first type of footwear) is shown on first driver control 110. For example, the design of shoe 770 can severely limit an amount of contact that shoe 770 has with a surface of first driver control 110 and/or place the driver's foot in an ergonomically challenged orientation, which can significantly affect a driver's ability to engage the driver controls 110, 120. Shoe 770 can be detected by one or more sensors (e.g., sensors 270, 280) and identified as a first type of footwear by detecting, e.g., a pronounced heel portion of the shoe. When a high heel shoe is detected, a warning can be sent to the driver (e.g., video, text, and/or audio message) to indicate the inherent risk and impairment associated with this type of footwear.

In FIG. 7B, flip flop shoe 775 (e.g., second type of footwear) is shown on first driver control 110. The design of shoe 775 can both severely limit an amount of contact that a user's foot has with a surface of first driver control 110, and edges of shoe 775 can get caught on adjacent driver controls (e.g., driver control 120), which can significantly affect a driver's reaction time. Shoe 775 can be detected by one or more sensors (e.g., sensors 270, 280) and identified as a second type of footwear by detecting a space 775 between the driver's heel and a top surface of shoe 775 (as shown), or by other dimensional properties of the shoe, as would be understood by one of ordinary skill in the art. For example, when an inappropriate type of footwear (e.g., flip flops) is detected, a warning can be sent to the driver (e.g., video, text, and/or audio message) to indicate the inherent risk and impairment associated with this type of footwear. Other types of shoes can be categorized, identified, and addressed accordingly by the present invention, as would be appreciated by one of ordinary skill in the art. Typically, a side view (e.g., location of sensor 280) is a preferred view to detect a type of footwear.

In some embodiments, other dangerous objects that are not classified as a "foreign object" may be identified by the embodiments described herein. For example, floor mat 130 may be incorrectly installed such that it is offset and protrudes from the floor of the cabin, which may cause the first or second driver control 110, 120 to get stuck. Certain embodiments can identify the misalignment of floor mat 130 and alert the driver accordingly.

Figure 8:
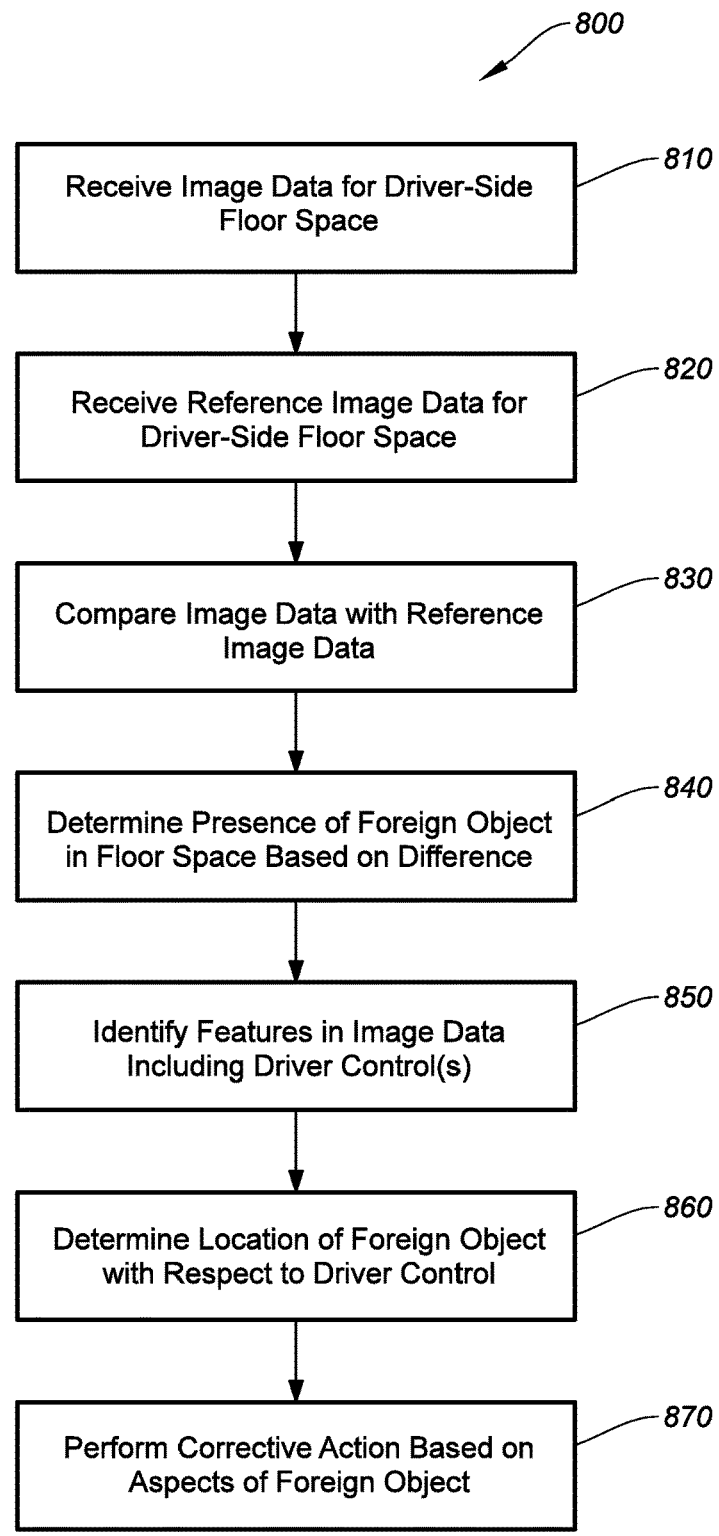
FIG. 8 shows a simplified flow chart for monitoring a driver-side floor space in a cabin of a vehicle, according to certain embodiments.

FIG. 8 shows a simplified flow chart for monitoring a driver-side floor space in a cabin of a vehicle, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by processor 904, or other suitable computing device.

At step 810, method 800 can include accessing, by a processor, image data corresponding to a driver-side floor space in the cabin. The image data can be received from one or more sensors that may include a digital camera, LIDAR system, any image-based (or audio-based) system, audio-based system, or a combination thereof, as further discussed above with respect to FIG. 2. The image data can be received from the one or more sensors continuously, intermittently, or at any suitable periodic or aperiodic interval.

In some embodiments, an image can be generated by the one or more sensors every time the driver opens the door on the driver-side of the vehicle, although other rules for image generation can be used. The algorithm (e.g., method 800) may check that the lighting for the image is sufficient. If not, additional images can be generated and/or lights can be used to better illuminate the area.

At step 820, method 800 can include accessing, by the processor, reference image data corresponding to the driver-side floor space in the cabin. The reference image data can include calibration image data taken of the driver-side floor space at the time of manufacture, or at any time when the driver is not sitting on seat 140, as further discussed above with respect to FIGS. 4 and 5. The reference image data is typically free of any foreign objects in the driver-side floor space.

At step 830, method 800 can include comparing, by the processor, the image data with the reference image data to generate a difference image. At step 840, method 800 can include determining that a foreign object is in the driver-side floor space based on the difference between the image data and reference image data. A foreign object can be any suitable object that may not be fixed to the vehicle cabin and/or freely moves around the driver-side floor space. Some non-limiting typical examples include bottles, cans, toys, athletic equipment, electronic devices, keys, and the like.

At step 850, method 800 can include identifying, by the processor, a set of features in the received image data and the reference image data, which may include a driver control in the driver-side floor space, as further discussed above with respect to FIG. 3. Data associated with the identified set of features can be stored locally (e.g., storage device 906, local area network, etc.), remotely (e.g., via cloud computing), or a combination thereof. Identifying known features can help differentiate them from foreign objects and can reduce false positive foreign object identifications.

At step 860, method 800 can include determining, by the processor, a location of the foreign object in the driver-side floor space. At step 870, method 800 can include performing a corrective action in response to determining that a foreign object is in the driver-side floor space. The corrective action can be based on the location of the foreign object with respect to a location of the driver control. For example, a foreign object lodged under or near seat 140 would likely be a lower safety risk than a foreign object lodged behind driver controls 110, 120, and the corrective action can be modified accordingly. In some embodiments, the corrective action can include an audio and/or video-based alert when the identified foreign object is located beyond a threshold distance from the location of the driver control. In contrast, the corrective action may include taking autonomous control of the vehicle when the foreign object is within a threshold distance from the location of the driver control, as this could be a highly dangerous situation. Certain autonomous actions could include automatically pulling the vehicle to the side of the road in a traffic-appropriate manner to provide the driver an opportunity to remove the foreign object from the driver-side floor space. The threshold distance for the foreign object with respect to a driver control can be any suitable distance (e.g., less than one foot), as would be understood by one of ordinary skill in the art.

In some implementations, the set of features can further include a driver's footwear located in the driver-side floor space (see, e.g., FIGS. 7A-7B), such that the processor can determine that the driver's footwear is of a first type of footwear based on an amount of contact between a bottom surface of the footwear and the driver control, and determine that the driver's footwear is of a second type of footwear based on an amount of contact between a bottom surface of the driver's foot and the driver's footwear. In such cases, generating the alert may occur when the driver's footwear is of the first type or the second type of footwear.

It should be appreciated that the specific steps illustrated in FIG. 8 provide a particular method 800 of monitoring a driver-side floor space in a cabin of a vehicle, according to certain embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. For example, some embodiments may forego the feature detection and location steps (e.g., steps 850-860). One of ordinary skill in the art would recognize and appreciate many variations, modifications, and alternatives of method 800.

Figure 9:
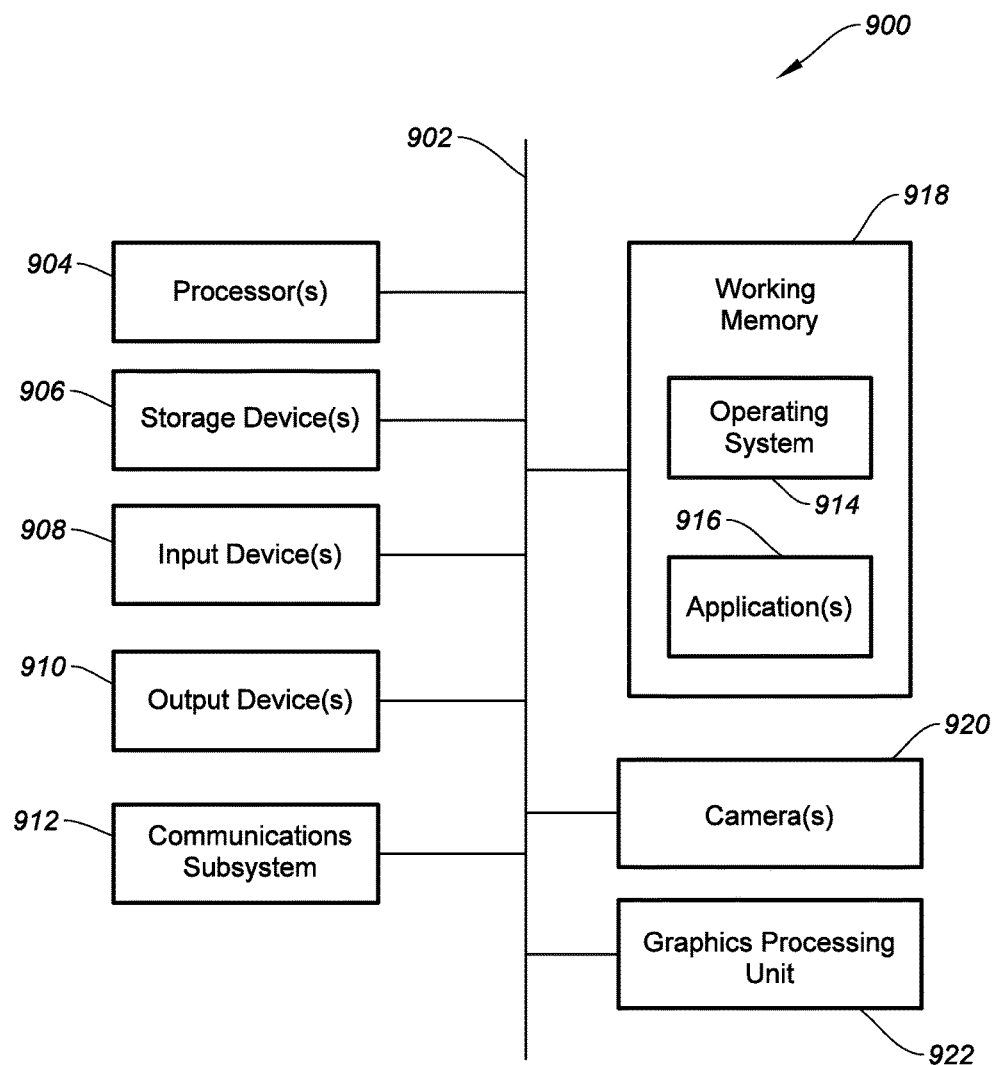
FIG. 9 shows a simplified block diagram of a computer system for performing certain aspects of monitoring a driver-side floor space in a cabin of a vehicle, according to certain embodiments.

FIG. 9 is a simplified block diagram of computer system 900 for performing certain aspects of monitoring a driver-side floor space in a cabin of a vehicle, according to certain embodiments. Computer system 900 can be used to implement and/or control any of the computer systems/devices (e.g., sensors 270, 280, machine learning, image detection and comparison, etc.) described with respect to FIGS. 2-8. As shown in FIG. 9, computer system 900 can include one or more processors 904 to communicate with a number of peripheral devices via a bus subsystem 902. These peripheral devices can include storage devices 906 (including long term storage and working memory), user input devices 908 (e.g. sensors 270, 280), user output devices 910 (e.g., video display 490 to communicate detected foreign object (or certain shoe types) based on method 800), and communications subsystems 912.

In some embodiments, a graphics processing unit (GPU) 922 can be used independently or in conjunction with processor(s) 906 to control one or more output devices 910. For example, output devices 910 may include one or more displays in a vehicle. GPU 922 and/or processors) 904 may control graphics, user interface characteristics (e.g., see FIG. 4), or other display-based function, as would be understood by one of ordinary skill in the art.

In some examples, internal bus subsystem 902 can provide a mechanism for letting the various components and subsystems of computer system 900 communicate with each other as intended. Although internal bus subsystem 902 is shown schematically as a single bus, alternative embodiments of the bus subsystem can utilize multiple buses. Additionally, communications subsystem 912 can serve as an interface for communicating data between computer system 900 and other computer systems or networks (e.g., in the cloud). Embodiments of communications subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 908 can include a microphone, keyboard, pointing devices (e.g., mouse, trackball, touchpad, etc.), a barcode scanner, a touch-screen incorporated into a display, audio input devices (e.g., voice recognition systems, etc.), Human Machine Interfaces (HMI) and other types of input devices. In general, use of the term "input device" is intended to include all possible types of devices and mechanisms for inputting information into computer system 900. Additionally, user interface output devices 910 can include a display subsystem or non-visual displays such as audio output devices, etc. The display subsystem can be any known type of display device. In general, use of the term "output device" is intended to include all possible types of devices and mechanisms for outputting information from computer system 900.

Storage devices 906 can include memory subsystems and file/disk storage subsystems (not shown), which can be non-transitory computer-readable storage media that can store program code and/or data that provide the functionality of embodiments of the present disclosure (e.g., method 800). In some embodiments, storage devices 906 can include a number of memories including main random access memory (RAM) for storage of instructions and data during program execution and read-only memory (ROM) in which fixed instructions may be stored. Storage devices 906 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

Computer system 900 can also include software elements, shown as being currently located within working memory 918, including an operating system 914, device drivers, executable libraries, and/or other code, such as one or more application programs 916, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 906 described above. In some cases, the storage medium might be incorporated within a computer system, such as computer system 900. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by computer system 900 and/or might take the form of source and/or installable code, which, upon compilation and/or installation on computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of computer system 900 may be omitted or may be implemented separate from the illustrated system. For example, processor(s) 904 and/or other elements may be implemented separate from input device 908. In one implementation, the processor may be configured to receive images from one or more cameras 920 (e.g., sensors 270, 280).

Some implementations may employ a computer system (such as computer system 900) to perform methods in accordance with the disclosure. For example, some or all of the procedures of the described methods (e.g., method 800) may be performed by computer system 900 in response to processor 904 executing one or more sequences of one or more instructions (which might be incorporated into operating system 914 and/or other code, such as an application program 916) contained in the working memory 918. Such instructions may be read into working memory 918 from another computer-readable medium, such as one or more of storage device(s) 906. Merely by way of example, execution of the sequences of instructions contained in working memory 918 might cause processor(s) 904 to perform one or more procedures of the methods described herein.

The terms "machine-readable medium" and "computer-readable medium," as used herein, refer to any medium that participates in providing data that causes a machine to operate in a specific fashion. In some implementations implemented using computer system 900, various computer-readable media might be involved in providing instructions/code to processor(s) 904 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 906. Volatile media include, without limitation, dynamic memory, such as working memory 918.

Transmission media include, without limitation, coaxial cables, copper wire, and fiber optics, including the wires that comprise bus 902, as well as the various components of communications subsystem 912 (and/or the media by which communications subsystem 912 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to processor(s) 904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 900. These signals, which might be in the form of electromagnetic signals, acoustic signals, optical signals and/or the like, are all examples of carrier waves on which instructions can be encoded, in accordance with various implementations of the invention.

Computer system 900 might also include a communications subsystem 912, which can include without limitation, a modem, a network card (wireless or wired), an infrared communication device, a wireless communication device and/or chipset (such as a Bluetooth device, an 802.11 device, a WiFi device, a WiMax device, cellular communication facilities, etc.), and/or the like. Communications subsystem 912 may permit data to be exchanged with a network, other computer systems, and/or any other devices described herein. In many implementations, computer system 900 can further comprise a non-transitory working memory 918, which can include a RAM or ROM device, as described above.

In some embodiments, camera(s) 920 can include type of image based sensor or video system including, but not limited to, digital camera systems, IR sensors, LIDAR systems, audio-based systems (e.g., ultrasonic, sonar, etc.), or the like. For example, camera(s) 920 can include sensors 270, 280 of FIG. 2.

It should be appreciated that computer system 900 is illustrative and not intended to limit embodiments of the present disclosure. Many other configurations having more or fewer components than system 900 are possible.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof. Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A computer-implemented method of monitoring a cabin in a vehicle, the method comprising:
    accessing, by a processor, image data corresponding to a driver-side floor space in the cabin;
    accessing, by the processor, reference image data corresponding to the driver-side floor space in the cabin;
    comparing, by the processor, the image data with the reference image data to identify a set of features in the received image data and the reference image data, wherein the set of features includes a driver's footwear located in the driver-side floor space;
    determining that the driver's footwear is an inappropriate type of footwear based on characteristics of the footwear including physical dimensions, an amount of contact between a bottom surface of the footwear and a driver control, or an amount of contact between a bottom surface of a driver's foot and the driver's footwear; and
    generating an alert when the driver's footwear is determined to be an inappropriate type of footwear.

2. The computer-implemented method of claim 1 wherein the image data is received from one of a digital camera or a light detection and ranging (LIDAR) system.

3. The computer-implemented method of claim 1 wherein the method further comprises:
    determining, by the processor, that a foreign object is in the driver-side floor space based on a difference between the image data and reference image data, wherein the reference image data does not include any foreign objects;
    wherein the foreign object is not fixed to the vehicle cabin and freely moves around the driver-side floor space.

4. The computer-implemented method of claim 1 wherein the set of features includes the driver control in the driver-side floor space.

5. The computer-implemented method of claim 4 further comprising:
    determining, by the processor, a location of the foreign object in the driver-side floor space; and
    performing a corrective action, by the processor, in response to determining that the foreign object is in the driver-side floor space;
    wherein the corrective action is based on the location of the foreign object with respect to a location of the driver control.

6. The computer-implemented method of claim 5 wherein the corrective action includes an audio or video-based alert when the foreign object is located beyond a threshold distance from the location of the driver control, and
    wherein the corrective action includes taking autonomous control of the vehicle when the foreign object is within a threshold distance from the location of the driver control.

7. A system comprising:
    one or more processors; and
    one or more non-transitory computer-readable storage mediums containing instructions configured to cause the one or more processors to perform operations including:
    accessing image data corresponding to a driver-side floor space in the cabin;
    accessing reference image data corresponding to the driver-side floor space in the cabin;
    comparing the image data with the reference image data to identify a set of features in the received image data and the reference image data, wherein the set of features includes a driver's footwear located in the driver-side floor space,
    determining that the driver's footwear is an inappropriate type of footwear based on characteristics of the footwear including physical dimensions, an amount of contact between a bottom surface of the footwear and a driver control, or an amount of contact between a bottom surface of a driver's foot and the driver's footwear; and
    generating an alert when the driver's footwear is determined to be an inappropriate type of footwear.

8. The system of claim 7 wherein the image data is received from one of a digital camera or a light detection and ranging (LIDAR) system.

9. The system of claim 7 further comprising instructions configured to cause the one or more processors to perform:
    determining that a foreign object is in the driver-side floor space based on a difference between the image data and reference image data, wherein the reference image data does not include any foreign objects; and
    wherein the foreign object is not fixed to the vehicle cabin and freely moves around the driver-side floor space.

10. The system of claim 7
    wherein the set of features includes the driver control in the driver-side floor space.

11. The system of claim 10 further comprising instructions configured to cause the one or more processors to perform operations including:
    determining a location of the foreign object in the driver-side floor space; and
    performing a corrective action in response to determining that the foreign object is in the driver-side floor space;
    wherein the corrective action is based on the location of the foreign object with respect to a location of the driver control.

12. The system of claim 11 wherein the corrective action includes an audio or video-based alert when the foreign object is located beyond a threshold distance from the location of the driver control, and
    wherein the corrective action includes taking autonomous control of the vehicle when the foreign object is within a threshold distance from the location of the driver control.

13. The system of claim 7, wherein the foreign object is a bottle or can.

14. A computer-implemented method of monitoring a cabin in a vehicle, the method comprising:
- accessing, by a processor, image data corresponding to a driver-side floor space in the cabin;
- analyzing, by the processor, the image data;
- identifying, in the image data by the processor, a driver's footwear in the driver-side floor space;
- determining, by the processor, physical characteristics of the driver's footwear;
- determining, by the processor, that the driver's footwear is inappropriate footwear for driving based on the determined physical characteristics of the driver's footwear; and
- performing, by the processor, a corrective action in response to determining that driver's footwear is inappropriate footwear for driving.

15. The computer-implemented method of claim 14 where the image data is received from one of a digital camera or a light detection and ranging (LIDAR) system.

16. The computer-implemented method of claim 14 wherein the determined physical characteristics include at least one of the driver's footwear physical dimensions.

17. The computer-implemented method of claim 14 wherein the corrective action includes an audio or video-based alert.

18. The computer-implemented method of claim 14 wherein the corrective action includes taking autonomous control of the vehicle.

* * * * *